United States Patent [19]

Estabrook

[11] 3,783,484

[45] Jan. 8, 1974

[54] METHOD OF MAKING BUILT-UP TIRE WITH BUTT WELDED INTERNAL BAND IRON

[75] Inventor: Frederick D. Estabrook, Lookout Mountain, Tenn.

[73] Assignee: Mitchell Industrial Tire Co., Inc., Chattanooga, Tenn.

[22] Filed: Nov. 4, 1971

[21] Appl. No.: 195,683

Related U.S. Application Data

[63] Continuation-in-part of Ser. No. 860,359, Sept. 23, 1969.

[52] U.S. Cl................ 29/159.1, 29/433, 152/307
[51] Int. Cl............................ B21h 1/10, B21k 1/38
[58] Field of Search................ 29/159.1, 159 R, 29/433; 152/307, 388

[56] References Cited
UNITED STATES PATENTS

| | | | |
|---|---|---|---|
| 719,329 | 1/1903 | Haines | 152/393 X |
| 2,282,750 | 5/1942 | Schueler | 29/433 |
| 2,704,102 | 3/1955 | Starr et al. | 152/307 |
| 2,883,743 | 4/1959 | Estabrook | 29/433 |
| 2,901,020 | 8/1959 | Starr et al. | 29/433 X |

Primary Examiner—Richard J. Herbst
Assistant Examiner—V. A. DiPalma
Attorney—Lamont Johnston

[57] ABSTRACT

The method of making a tire built up from many radial compressible pads having registering openings through which an internal band iron passes. The pads are compressed together into a toroidal shape under heavy force, bringing the ends of the band iron into abutment within a spacer and must be aligned with great accuracy for welding in order to accomplish maximum strength of the finished product. Instead of a lap joint as heretofore used, the ends are butt welded together.

1 Claim, 5 Drawing Figures

PATENTED JAN 8 1974  3,783,484

METHOD OF MAKING BUILT-UP TIRE WITH BUTT WELDED INTERNAL BAND IRON

This application is a continuation of my application Ser. No. 860,359, filed Sept. 23, 1969.

BACKGROUND OF THE INVENTION

As shown in U.S. Pat. No. 2,901,020, issued Aug. 25, 1959, to Starr et al., the present method of connecting the ends of the internal band iron of a built-up tire is by lapping one end over the other, bolting them together and welding the edges. That method builds weaknesses into the internal bar which are due to a crooked path of the stress forces passing through the lap joint. These stress forces must travel from the general cross section of the bar to the outer edge near the ends, must then pass through the weld to the outer edge of the other end and then back to the general cross section of the bar. This stress path is not a perfect circle. Upon severe impact of the tire against the edge of a pothole, curb or any other obstruction, the stress increases and the stress path tries to bend the bar into a perfect circle. This bending action concentrates the stresses in such a manner as to flex the bar, which will fatigue and break after repeated stressing under rugged conditions.

This invention proposes a straight line stress path from one end of the steel bar directly into the other end by butt welding the ends together in a perfect circle with true alignment. This type of joint will not distort and flex under severe impact or any severe impact or any severe stress and prevents flexing of the internal bar which reduces fatigue and breakage.

BRIEF DESCRITPION OF THE DRAWING

DESCRIPTION OF THE PREFERRED EMBODIMENT

Figure 1:
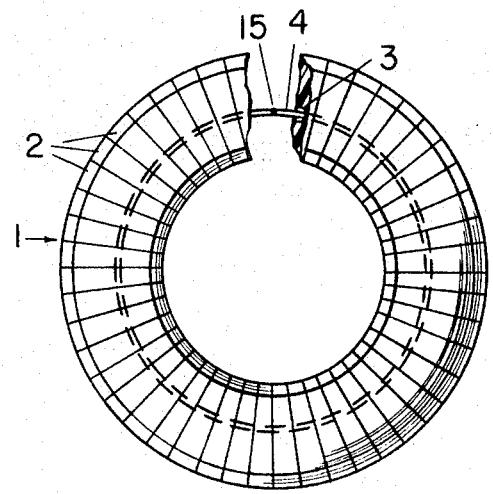
FIG. 1 is a side elevation of one embodiment of the invention, partly broken away.

In FIG. 1, there is shown a side view, partly broken away, of a tire 1 made in accordance with this invention. The tire consists of many radially disposed slightly compressible pads 2 which are usually made by stamping sections from old tire carcasses, the sections thus including rubber and fabric, as shown in the Starr et al. Pat. No. 2,901,020. The sections have openings 3 which are in register and form a series through which an internal band iron 4 is passed. In assembly of the tire, the pads 2 are compressed together under a heavy force into a circle. During the compression, the ends of the internal band iron 4 extend through the registering openings 3, are brought into abutment within a spacer and must be aligned with great accuracy for welding in order to accomplish maximum strength of the finished product.

Figure 2:
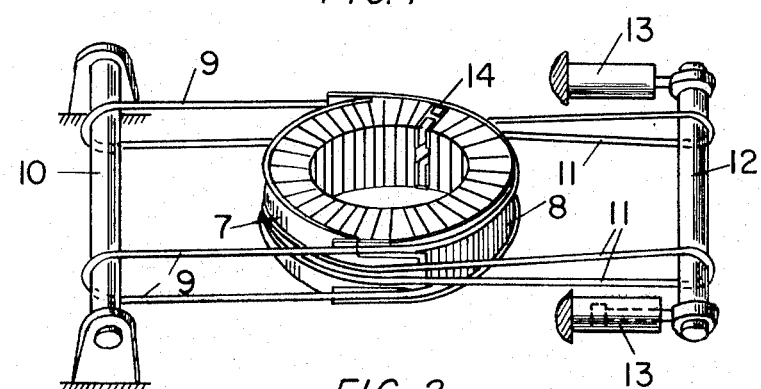
FIG. 2 is a perspective view of apparatus suitable for use in the compression of tires of the type described.

In use of an apparatus for compression of the tire, such as that illustrated in FIG. 2, as in Estabrook Pat. No. 2,883,743, issued Apr. 28, 1959, a pair of strips 7 and 8 about the width of the tire being formed, having flat cross sections and being somewhat curved, form a telescoping sheath, which are reduced in diameter as the tire is circumferentially compressed. The compression is accomplished by means of one set of flexible cables 9 passed around a fixed bar 10. Another set of cables 11 are passed around a movable bar 12, which is actuated by hydraulic jacks 13 to force the bar 12, the cables 11 and the strip 7 toward the strip 8, which is held against motion by the cables 9 and the fixed bar 10. In doing this, the tire is compressed under a heavy force. Great care must be exercised during the compression to bring the ends of the band iron into precise abutment in all directions. The two ends must be in exact alignment in a diametric direction, circumferentially and axially. Also, the entire surfaces of both ends must be exactly aligned in a circular direction.

Figure 3:
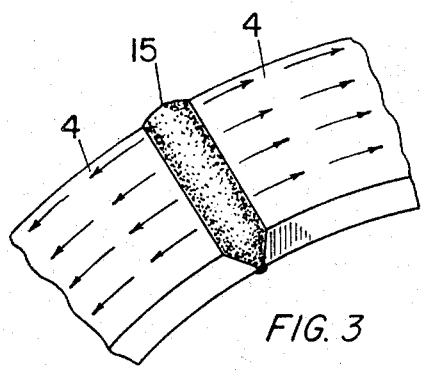
FIG. 3 is an enlarged perspective view showing a butt welded joint and arrows to indicate the directions of the lines of force in the band iron.

Before the compression is begun, a removable section 14 is placed between two of the pads, this being comparable to the spacer illustrated in my patent identified above, or to such spacers shown in other patents. Such a spacer has an opening in its outer periphery and an opening at its axial ends and through those openings a butt weld 15 between the ends of the band iron 4 is made, as shown in FIG. 1 and, more clearly, in FIG. 2. FIG. 2 discloses the band iron and method of this invention, which involves placing the ends of the band iron in nearly perfect alignment in a butt welded joint, so that stress forces acting on the band iron can pass directly in a straight line through the weld connection without any distortion whatsoever in the stress path. This is shown in FIG. 3 by the arrows indicating the directions of the lines of force in the band iron through the weld. Consequently, under heavy stress, this bar will keep its perfect circle shape and will not flex appreciably to cause metal fatigue and breakage.

Figure 4:
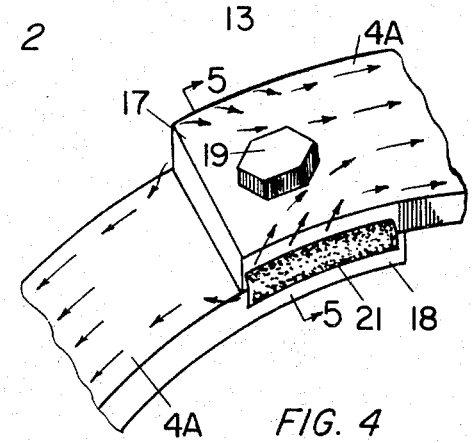
FIG. 4 is an enlarged perspective view showing the conventional bolted and lap welded joint and arrows indicating the directions of the line of force.
Figure 5:
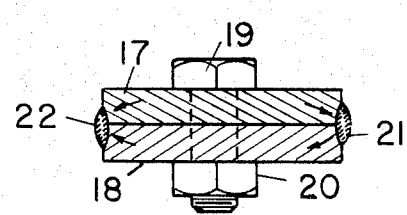
FIG. 5 is a cross sectional view on the line 5—5 of FIG. 4

In contrast, as shown in FIGS. 4 and 5, the conventional bolted and lap-welded joint has several disadvantages. One of the more apparent disadvantages is that where one end 17 of a band iron 4A overlaps the other end 18 of the band iron, the band iron is obviously not in a perfect circle and there is a tendency to cause a slight protrusion of the pads at that point and to cause thereby a slight bumping Also, since the two ends of the band iron are not in perfect circle alignment, rotation of the tire under a load tends to cause flexing and metal fatigue in the band iron. The use of a bolt 19 and nut 20 through holes in the ends 17 and 18 of the band iron, together with the welds 21 and 22 at the side edges of the band iron ends 17 and 18, does not provide so strong a bond or union as does a butt weld 15. Of course, use of a bolt requires the boring or punching of holes in both ends of the bar, putting the bolt in place through the holes and tightening the nut onto the bolt while the tire is maintained under heavy compression. While the problem this presents has been solved, performing these operations nevertheless consumes an appreciable amount of time of a highly skilled man. In addition, the very fact that holes are bored or punched through the ends of the band iron reduces the cross section and thus reduces the strength of the band iron.

The arrows in FIGS. 4 and 5 represent the stress paths having to diverge to the edges of the joint of the band iron ends to enable the stress to pass through the welds and then back toward the center of the band iron to spread itself out over the whole bar. In FIG. 5, the arrows show the stress as coming from the upper end 17 of the band iron, through the welds 21 and 22 at the edges of the band iron ends and reversing its direction as it comes out in the lower end 18 of the band iron. These stresses, being in two different planes, cause the bar to flex under severe impact or any increase in stress of the bar. This flexing increases metal fatigue, which leads to early breakage of the band iron.

From the foregoing, it will be readily apparent that applicant's invention has many advantages, among them being the following:

1. Connection of the ends of the internal band iron with a butt weld to make a nearly perfect circle shape of the band iron to hold the tire in a nearly perfect circle;
2. Connecting the ends of the band iron with a butt fillet weld to form a straight line stress path to reduce flexing and fatigue in the metal bar;
3. Connecting the ends with a butt fillet weld to form a stronger union;
4. Connecting the ends of the band iron with a butt fillet weld to eliminate the necessity of boring or punching a hole in the bar to make a lap joint and to eliminate the necessity of using a bolt; and
5. Connecting the ends of the band iron with a butt fillet weld to eliminate the necessity of weakening the bar by boring or punching a hole which reduces the cross section and thus reduces the strength of the bar.

It will be apparent to those skilled in the art that various changes may be made in the invention, without departing from the spirit and scope thereof, and therefore the invention is not limited by that which is shown in the drawings and described in the specification, but only as indicated in the appended claims.

I claim:

1. The method of making a tire including a multiplicity of substantially radially disposed slightly compressible pads, the pads having in them a series of registering openings through which a heavy internal band iron passes in a substantially circular path, which includes assembling the pads with the band iron passing through their openings, circumferentially compressing the pads together into a toroidal shape under a heavy hydraulic force with each pad in a substantially radial disposition and with the ends of the band iron in precise abutment diametrically, circumferentially, axially and circularly, leaving a relatively small space between terminal pads adjacent to those ends, butt fillet welding the ends of the band iron, and releasing the compression of the pads.

* * * * *